United States Patent
Evans, Sr. et al.

(10) Patent No.: US 8,216,622 B2
(45) Date of Patent: Jul. 10, 2012

(54) AUTOMATIC POPCORN POPPER WITH FLEXIBLE LOAD CAPABILITIES

(75) Inventors: John C. Evans, Sr., Cocoa Beach, FL (US); John J. Ryan, Edgewood, KY (US)

(73) Assignee: Gold Medal Products Company, Cincinnati, OH (US)

( * ) Notice: Subject to any disclaimer, the term of this patent is extended or adjusted under 35 U.S.C. 154(b) by 404 days.

(21) Appl. No.: 10/277,256

(22) Filed: Oct. 22, 2002

(65) Prior Publication Data

US 2003/0159591 A1     Aug. 28, 2003

Related U.S. Application Data

(62) Division of application No. 10/085,166, filed on Feb. 27, 2002, now Pat. No. 6,672,201.

(51) Int. Cl.
*A23L 1/18* (2006.01)

(52) U.S. Cl. ....... 426/233; 426/625; 426/523; 99/323.7; 99/323.8; 99/333

(58) Field of Classification Search .................. 426/523, 426/231, 233, 625, 438; 99/323.4–323.11, 99/325–333
See application file for complete search history.

(56) References Cited

U.S. PATENT DOCUMENTS

| | | | |
|---|---|---|---|
| 1,218,341 A | 3/1917 | Truitt | 219/400 |
| 1,477,704 A | 12/1923 | Holcomb et al. | 99/323.9 |
| 1,545,357 A | 7/1925 | Schwimmer | 99/238.3 |
| 1,704,133 A | 3/1929 | LeClaire | 99/323.8 |
| 1,789,902 A | 1/1931 | Jackson | 99/323.7 |
| 1,977,831 A | 10/1934 | Marshall et al. | 221/47.1 |
| 2,017,293 A | 10/1935 | Priest | 53/4 |
| 2,027,698 A | 1/1936 | Parks et al. | 53/4 |
| 2,034,484 A | 3/1936 | Pagendam | 194/48 |
| 2,123,663 A | 7/1938 | Roach | 53/4 |
| 2,134,682 A | 11/1938 | Burch | 219/44 |
| 2,230,460 A | 2/1941 | Kleinwachter | 312/121 |
| 2,232,954 A | 2/1941 | Manley | 53/4 |
| 2,248,812 A | 7/1941 | Cretors | 53/4 |
| 2,254,271 A | 9/1941 | Cretors | 53/4 |
| 2,458,190 A | 1/1949 | Newburger | 219/19 |
| 2,529,877 A | 11/1950 | Ladge | 34/88 |
| 2,536,298 A | 1/1951 | Manley | 99/238.1 |
| 2,537,744 A | 1/1951 | Cretors | 99/238.5 |
| 2,549,449 A | 4/1951 | Gibson | 99/238.4 |
| 2,575,643 A | 11/1951 | Tamsen | 34/225 |
| 2,586,347 A | 2/1952 | Kloster | 99/238.1 |
| 2,646,189 A | 7/1953 | Wickesberg | 222/36 |
| 2,654,823 A | 10/1953 | Altemiller | 219/19 |

(Continued)

FOREIGN PATENT DOCUMENTS

CA     682731     3/1964     65/45

(Continued)

*Primary Examiner* — Drew E Becker
(74) *Attorney, Agent, or Firm* — Wood, Herron & Evans, LLP

(57) ABSTRACT

An automatic popcorn popper which has selectable load capabilities for popping various differently sized loads of corn. A heat control system is provided having a selector switch for selecting one of multiple rates of heat to be delivered to the kettle. An oil delivery system is coupled to the selector switch for selecting one of varying amounts of oil to be delivered to the kettle in conjunction with selecting the rate or amount of heat to be delivered to the kettle.

11 Claims, 8 Drawing Sheets

U.S. PATENT DOCUMENTS

| | | | |
|---|---|---|---|
| 2,727,798 A | 12/1955 | Campo | 311/35 |
| 2,729,953 A | 1/1956 | Schilling | 62/122 |
| 2,743,633 A | 5/1956 | Powell | 81/9.51 |
| 2,812,704 A | 11/1957 | Hawks | 99/238.2 |
| 2,856,841 A | 10/1958 | Cretors et al | 99/238 |
| 2,859,015 A | 11/1958 | Spangler | 257/2 |
| 2,907,264 A | 10/1959 | Bushway | 99/238.3 |
| 2,939,379 A | 5/1960 | Schmitt | 99/238.4 |
| 2,972,292 A | 2/1961 | Waas et al. | 99/238.4 |
| 2,984,169 A | 5/1961 | Bushway | 99/238.5 |
| 3,095,326 A | 6/1963 | Green et al. | 118/11 |
| 3,102,032 A | 8/1963 | Lippert | 99/80 |
| 3,120,168 A | 2/1964 | Lippert | 99/238.3 |
| 3,197,076 A | 7/1965 | Chamblee | 222/146 |
| 3,223,291 A | 12/1965 | Thomas | 222/249 |
| 3,253,532 A | 5/1966 | Jones | 99/238.3 |
| 3,253,747 A | 5/1966 | Thomas | 222/88 |
| 3,254,800 A | 6/1966 | Baunach | 222/132 |
| 3,282,470 A | 11/1966 | Thomas | 222/166 |
| 3,294,546 A | 12/1966 | Fingerhut | 99/81 |
| 3,321,107 A | 5/1967 | Govin et al. | 222/2 |
| 3,512,989 A | 5/1970 | Smith | 99/81 |
| 3,554,115 A | 1/1971 | Manley | 99/238.3 |
| 3,584,586 A | 6/1971 | Manley et al. | 107/7 |
| 3,606,828 A | 9/1971 | Smith | 99/238.5 |
| 3,641,916 A | 2/1972 | McDevitt et al. | 99/238.3 |
| 3,645,422 A | 2/1972 | Cretors | 222/169 |
| 3,697,289 A | 10/1972 | Day et al. | 99/81 |
| 3,739,953 A | 6/1973 | Cretors | 222/318 |
| 3,783,820 A | 1/1974 | Hautly et al. | 118/19 |
| 3,812,774 A | 5/1974 | Day et al. | 99/323.8 |
| 3,930,966 A | 1/1976 | Takahashi et al. | 204/58 |
| 4,068,572 A | 1/1978 | Vogt | 99/447 |
| 4,094,446 A | 6/1978 | Brutsman | 222/146 |
| 4,120,236 A | 10/1978 | Blomberg | 99/323.9 |
| 4,133,456 A | 1/1979 | Corini | 222/146 |
| 4,171,066 A | 10/1979 | Hirose | 221/150 |
| 4,171,667 A | 10/1979 | Miller et al. | 99/323.6 |
| 4,178,843 A | 12/1979 | Crabtree et al. | 99/323.8 |
| 4,182,229 A | 1/1980 | VandeWalker | 99/323.6 |
| 4,203,357 A | 5/1980 | Vaussanvin | 99/340 |
| 4,206,695 A | 6/1980 | Cretors | 99/323.9 |
| 4,288,686 A | 9/1981 | Cretors | 219/512 |
| 4,307,657 A | 12/1981 | Avery | 99/323.7 |
| 4,372,354 A | 2/1983 | Moore | 141/361 |
| 4,397,874 A * | 8/1983 | Piotrowski | 426/450 |
| 4,421,146 A | 12/1983 | Bond et al. | 141/349 |
| 4,426,923 A | 1/1984 | Ohata | 99/468 |
| 4,438,682 A | 3/1984 | King et al. | 99/323.7 |
| 4,477,003 A | 10/1984 | Baker et al. | 222/642 |
| 4,484,697 A | 11/1984 | Fry, Jr. | 222/95 |
| 4,494,314 A | 1/1985 | Gell, Jr. | 34/10 |
| 4,557,399 A | 12/1985 | Redick, Jr. | 222/83.5 |
| 4,582,713 A | 4/1986 | Hirokawa et al. | 426/233 |
| 4,584,586 A | 4/1986 | Kocsi | 343/742 |
| 4,632,275 A | 12/1986 | Parks | 222/25 |
| 4,723,688 A | 2/1988 | Munoz | 222/88 |
| 4,727,798 A | 3/1988 | Nakamura | 99/323.9 |
| 4,763,568 A | 8/1988 | Kiczek | 99/323.5 |
| 4,850,120 A | 7/1989 | Stein | 34/88 |
| 4,919,308 A | 4/1990 | Majkrzak | 222/146.5 |
| 5,020,688 A | 6/1991 | Power | 221/150 A |
| 5,026,969 A | 6/1991 | Knepler et al. | 219/421 |
| 5,033,363 A | 7/1991 | King et al. | 99/323.7 |
| 5,035,173 A | 7/1991 | Stein et al. | 99/323.7 |
| 5,114,045 A | 5/1992 | Herpe | 222/105 |
| 5,121,857 A | 6/1992 | Hutchinson | 222/318 |
| 5,301,601 A | 4/1994 | Cretors | 99/323.5 |
| 5,309,825 A | 5/1994 | Pinone | 99/323.6 |
| 5,397,219 A | 3/1995 | Cretors | 417/299 |
| 5,404,797 A | 4/1995 | Millar | 99/357 |
| 5,555,792 A | 9/1996 | Stein et al. | 99/323.9 |
| 5,582,755 A * | 12/1996 | Maher et al. | 219/492 |
| 5,590,582 A | 1/1997 | Weiss | 99/323.5 |
| 5,657,684 A | 8/1997 | Chaikowsky | 99/323.7 |
| 5,662,024 A | 9/1997 | Cretors et al. | 99/323.7 |
| 5,694,830 A | 12/1997 | Hodgson et al. | 99/323.7 |
| 5,743,172 A | 4/1998 | Weiss et al. | 99/323.7 |
| 5,771,779 A | 6/1998 | Stein et al. | 99/323.7 |
| 5,871,792 A * | 2/1999 | Weiss et al. | 426/233 |
| 5,885,641 A | 3/1999 | Hodgson et al. | 426/445 |
| 5,925,393 A | 7/1999 | Stein et al. | 426/233 |
| 6,000,318 A | 12/1999 | Weiss et al. | 99/323.7 |
| 6,092,458 A | 7/2000 | Weiss et al. | 99/323.7 |
| 6,098,526 A | 8/2000 | Stein et al. | 99/323.9 |
| 6,135,011 A | 10/2000 | Hodgson et al. | 99/323.9 |
| 6,164,193 A | 12/2000 | Perttola | 99/323.9 |
| 6,234,063 B1 * | 5/2001 | Evers et al. | 99/323.7 |
| 6,352,731 B1 | 3/2002 | Weiss | 426/233 |
| 6,354,191 B1 | 3/2002 | Weiss et al. | 99/323.7 |
| 6,412,395 B1 | 7/2002 | Weiss et al. | 99/323.7 |
| 6,534,103 B2 | 3/2003 | Weiss | 426/233 |
| 1,786,877 A1 | 10/2003 | Thompson | 99/323.9 |
| 2,848,937 A1 | 10/2003 | Martin | 99/238.3 |
| 6,672,201 B2 | 1/2004 | Evans, Sr. et al. | 99/323.7 |
| 6,726,945 B2 | 4/2004 | Weiss | 426/233 |
| 6,829,982 B2 | 12/2004 | Weiss et al. | 99/323.7 |

FOREIGN PATENT DOCUMENTS

| | | |
|---|---|---|
| EP | 0364071 | 4/1990 |

* cited by examiner

AUTOMATIC POPCORN POPPER WITH FLEXIBLE LOAD CAPABILITIES

The present application is a divisional of U.S. Ser. No. 10/085,166, filed Feb. 27, 2002, now U.S. Pat. No. 6,672,201, the disclosure of which is hereby incorporated herein by reference in its entirety.

FIELD OF THE INVENTION

This invention relates generally to popcorn poppers and more specifically to an automatic popcorn popper which has selectable load capabilities for popping various differently sized loads of corn.

BACKGROUND OF THE INVENTION

Popcorn is mass-produced for sale at movies and other events in commercial popcorn poppers which generally include an enclosed, transparent cabinet containing a tiltable kettle suspended above a catch area or platform. The kettle is heated and uncooked popcorn kernels are placed therein to be cooked and popped. Oil, salt and other flavorings might also be added to the kettle for flavoring the corn in the popping process. Once the kernels are popped, the kettle is tilted, either manually or automatically, and the popcorn spills onto the platform to be scooped up, packaged and sold to customers.

As may be appreciated, depending upon the customer traffic at a particular facility and at the point of sale, different rates of corn production may be desired. It is generally preferable to have fresh batches of popped popcorn ready corresponding to customer traffic and customer needs. Not only does a batch of popcorn taste better when sold immediately after being popped, but also the aroma of the popping corn provides an olfactory incentive for the customer to purchase popcorn. At the same time, large amounts of popped popcorn should not be left sitting in the cabinet too long, so as to possibly become stale.

To that end, it is desirable for a facility's operator to be able to control the popcorn production rate to tailor that rate to the specific customer traffic and other needs at the point of sale. Various commercially available popcorn poppers operate either by providing a selected amount of time for a load to pop, and then indicating that the load is complete, or providing a more sophisticated and accurate temperature control of the kettle such that a load of corn is indicated as finished when the kettle temperature reaches a desirable set point coinciding with completion of the popping process. Sophisticated temperature control machines, such as those offered by Gold Medal Products Co. of Cincinnati, Ohio and disclosed in U.S. Pat. Nos. 6,000,318; 5,871,792; 5,743,172; and 5,694,830, generally have variable batch times for cooking different size loads of popcorn.

A facility operator will often be faced with heavy customer traffic periods, such as right before a set of movies is to start, followed by slower periods while the movies are playing. During the busy periods, the facility operator will want to increase the popcorn production rate, and thereby increase the size of the popcorn loads poured into the kettle.

As a result, it is one objective of the present invention to provide improved apparatus and/or methods to pop popcorn continuously in consecutive batches with minimal attention by an operator.

It is a still further objective of the invention to reduce the delays between fresh batches of popcorn attributable to lack of attention by the operator.

Still further, it is an objective to provide the proper and consistent temperature to the kernels as they cook to ensure proper popping conditions and to maximize the popcorn yield per unit of kernels.

SUMMARY OF THE INVENTION

The present invention overcomes the foregoing and other shortcomings and drawbacks of popcorn poppers and methods of popping uncooked popcorn kernels heretofore known. While the invention will be described in connection with certain embodiments, it will be understood that the invention is not limited to these embodiments. On the contrary, the invention includes all alternatives, modifications and equivalents as may be included within the spirit and scope of the present invention.

The invention addresses the above-listed objectives by providing a popcorn popper comprising a kettle for containing corn to be popped. A heating system for heating the kettle to pop the corn includes at least one heating element or, alternatively, a plurality of heating elements, thermally coupled to the kettle to heat the kettle. In accordance with one aspect of the present invention, the rate of heat delivered to the kettle is controlled by controlling the rate of heat generated by the heating element or elements. To that end, a heat control system is operably coupled to the heating element, and a selector switch is coupled to the heat control system. The selector switch has multiple selectable states or settings for selecting one of multiple rates of heat to be delivered to the kettle by the heating element. In that way, different size batches of corn might be cooked efficiently by varying the amount of heat, or rate of heat, delivered to the kettle to cook the various batches of corn.

In one embodiment, a plurality of heating elements are selectively turned ON and OFF through relays based upon a selected state or setting of the selector switch. The selectable states of the switch are reflective of various amounts of corn or various size batches that are to be popped. By turning different numbers of heating elements ON and OFF, the rate of heat delivered to the kettle is selected.

In accordance with another aspect of the present invention, the heat control system includes a temperature controller for determining when the heating elements will be turned ON through one or more of the relays. A sensor thermally coupled to the kettle inputs a signal to the temperature controller. If it is desirable to heat the kettle, the relays are energized based upon the selected state of the selector switch, and power is delivered to the selected heating elements. If the kettle has reached a temperature set point, the temperature controller effectively de-energizes the relays to prevent power from being delivered to any of the heating elements.

In an alternative embodiment, another relay might be interposed between the temperature controller and the heating element relays to remove power to those relays, such that the temperature controller determines when the heating elements are to be powered, regardless of whether the relays are energized or not.

In accordance with another aspect of the present invention, an oil delivery system is coupled to the selector switch for selecting one of varying amounts of oil to be delivered to the kettle in conjunction with selecting the rate or amount of heat to be delivered to the kettle. Indicators, such as visual indicators, are operable for providing a humanly perceptible indication corresponding to the selected state of the selector switch and the size of the batch of corn to be cooked. High limit switches, or high limit sensors, coupled to the temperature controller, are utilized for preventing the heating elements from exceeding the high limit temperature.

In accordance with another aspect of the present invention, the heat control system comprises a phase control system to control heat delivered to the kettle. The phase control system is operable for selectively adjusting portions of power cycles that are delivered to the heating element for thereby varying the amount of heat generated by the heating element. The selected portions of the power cycles to be delivered to the heating element are determined by the state of the selector switch.

In another alternative embodiment of the invention, the heat control system comprises a power cycle control system which is operable for varying the number of power cycles delivered to the heating element within a time period. This thereby varies the amount of heat generated by the heating elements within that time period. Based upon the selected state of the selector switch, the number of power cycles delivered to the heating elements within a time period is selected, for thereby selecting a heating rate for the kettle corresponding to the batch size of corn in the kettle.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 4 is a perspective view of the kettle of the popcorn popper of FIG. 1;

DETAILED DESCRIPTION OF SPECIFIC EMBODIMENTS

Figure 1:
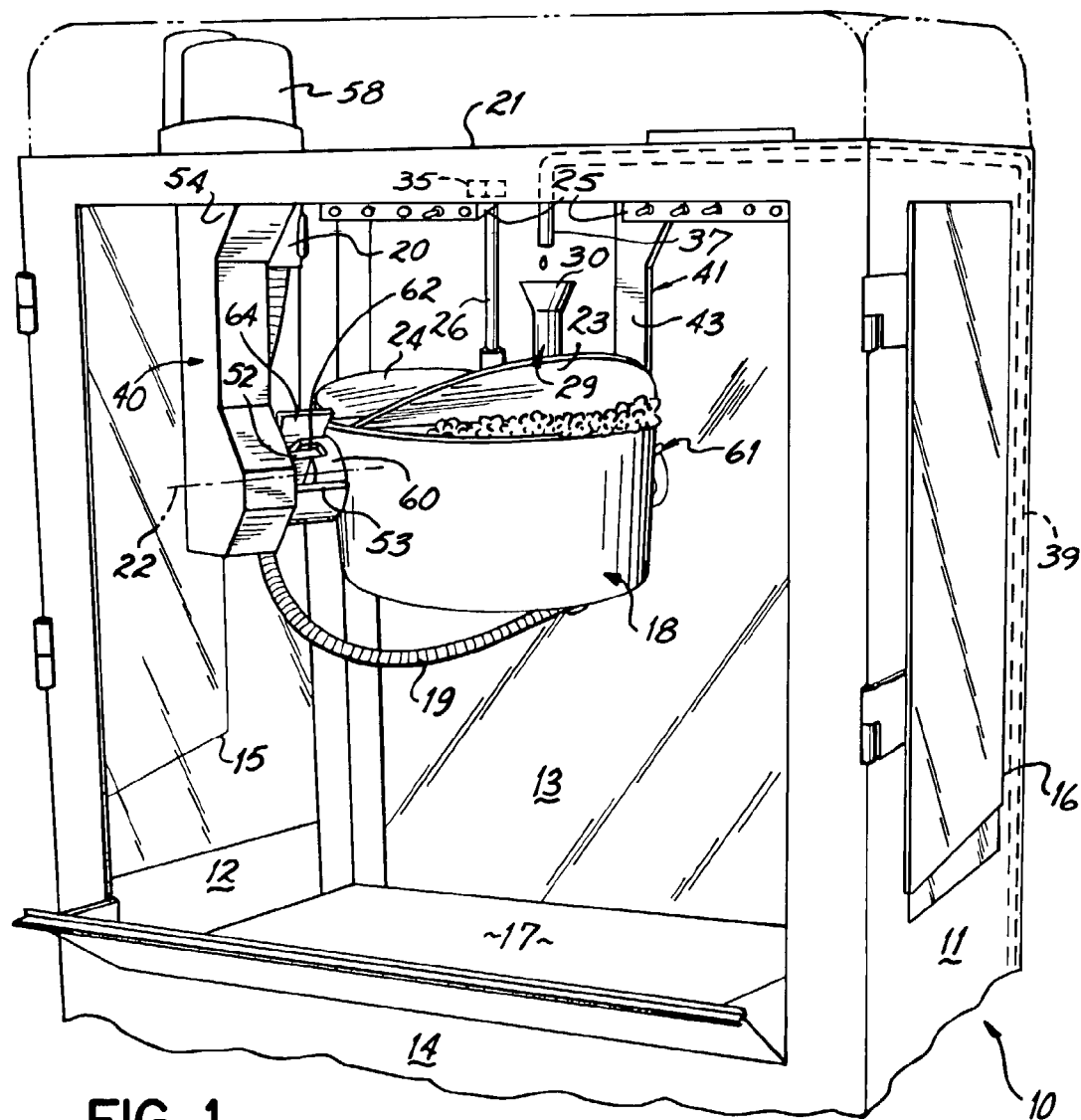
FIG. 1 is a perspective view of one possible popcorn popper apparatus utilizing the features of the present invention.

Turning now to the drawings, there is shown in FIG. 1 one possible embodiment of an automated popcorn popper 10 for practicing the various aspects of the present invention. It will be appreciated that the popper is operable to cook or to pop popcorn and is particularly useful for cooking consecutive batches of popcorn for sale by concessionaires at movie theaters, sport events, fairs and the like. Other differently constructed popcorn poppers may incorporate the features of the present invention. The specifically constructed popper shown in FIGS. 1 and 2 is only an example of one possible popper and is not meant to be limiting with respect to the utility of the present invention.

Figure 2:
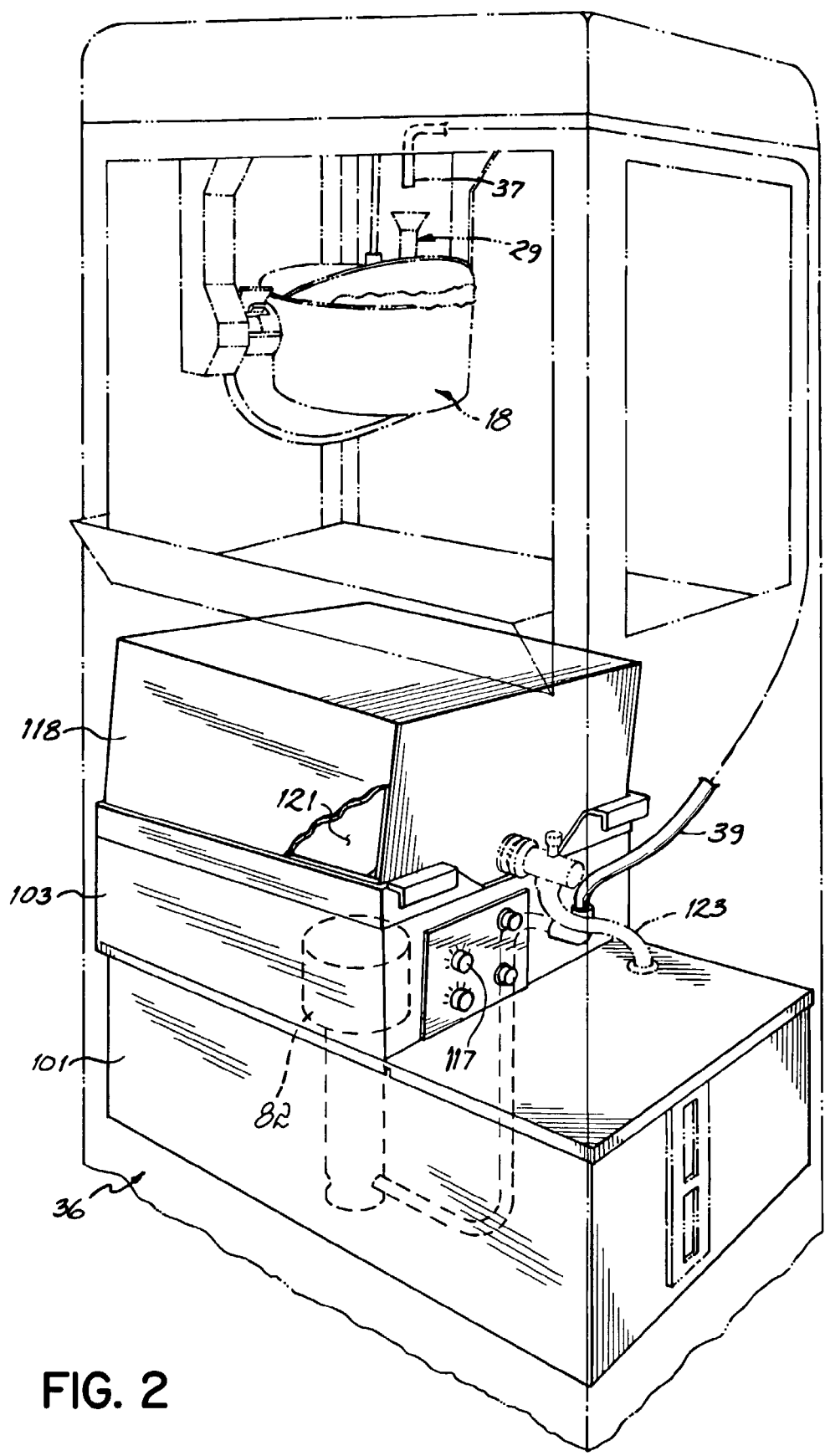
FIG. 2 is another perspective view of the popcorn popper of FIG. 1 illustrating one possible oil pump system to be utilized in accordance with features of the present invention.

The corn popper 10 in FIGS. 1 and 2 includes a cabinet having transparent walls including two sidewalls 11, 12, a rear wall 13, front wall 14, and a service platform 17 for catching popcorn. Front wall 14 includes two doors 15, 16, which can be opened to gain access, both to the popped corn on the platform 17 of the cabinet and to the kettle 18. Sidewalls 11, 12 and rear wall 13, as well as the front wall 14, including doors 15, 16, are all made preferably of a transparent material, such as glass or plastic material, so that the interior of the cabinet can be viewed from the exterior. The cabinet may also include various operating switches and light or visual indicators on an operating panel 25 for providing power to various of the subsystems of the popper, such as turning ON kettle heat, the dump motor, a warmer (not shown) under platform 17, and lights inside the cabinet as well as turning ON the heaters and pumps of an oil pump system (see in FIG. 2) for providing cooking oil for the operation. The lights may indicate that one or more of these systems are ON. In accordance with another aspect of the invention directed to the flexible batch sizes to be cooked, the popper 10 may include a switch for selecting a batch size and an audible or visual indicator for indicating the selected batch size, as discussed further below. Various of these systems and subsystems will now be described in greater detail in accordance with the principles of the present invention.

The cabinet of popper 10 also preferably includes an oil pump system 36 which may rest below the platform in the cabinet (see FIG. 2). The oil pump system 36 provides oil to the kettle during a cooking cycle and might be one of various different systems. For example, Gold Medal Products Co. of Cincinnati, Ohio, which is the owner/assignee of the present patent application, markets the Model 2114 Accumeter Bucket Pump for pumping popcorn oil. Another system, Model 2257 Rack Oil Delivery System, is also available from Gold Medal Products and is discussed in U.S. Pat. No. 5,590,582, entitled "Oil Supply for Popcorn Poppers", which application is incorporated herein by reference in its entirety.

FIG. 2 illustrates an oil pump system 36 which includes a container 118 on top of a control housing 103 which holds a flexible bag of oil 121. An oil tube 123 connects bag 121 and a reservoir 101. An oil pump 82 is coupled to the reservoir for delivering oil to the kettle through line 39, and the oil outlet 37. In accordance with one aspect of the present invention, controls within the control housing 103 are operably coupled with the rest of the operating system of the popcorn popper for automatically delivering the desired amount of oil to a kettle for a particular size batch of popcorn. For example, for one size batch of popcorn, a particular amount of oil will be delivered, while for a larger batch size, a greater amount may be delivered. This might be accomplished, for example, by different timing sequences for operating the pump 82 to deliver a desired amount of oil. Alternatively, a mechanical mechanism, such as a mechanical dial 117 might be utilized for controlling the amount of oil delivered to the kettle for a particular batch size. An oil heater 84 (not shown in FIG. 2) would generally be utilized for heating the oil to maintain it in a liquid form for being pumped to the kettle, as is known and is disclosed in the above-referenced patent. While those oil systems manufactured by Gold Medal Products Co. are preferable, a popper in accordance with the present invention might be utilized with other systems as well, or without an oil system.

The popping kettle 18 is of any suitable variety having a heater or heating elements (not shown in FIG. 1). In FIG. 1, the heater is shown interconnected by a control line 19 to a power plug 20 mounted inside on the top 21 of the cabinet. It will be appreciated that the kettle 18 is tiltable about a tilt axis 22, and is provided with covers 23 and 24, at least one of which is pivoted on the kettle 18. When the corn is popped, it pushes these covers open and falls out the sides of the kettle onto platform 17. Moreover, it will be appreciated that the cover 23 is located over a so-called "dump section" or side of the kettle 18. When the kettle is tilted, this cover pivots open to facilitate dumping of popcorn onto platform 17.

Positioned between covers 23, 24 is an oil funnel 29 which has a flared funnel mouth 30. When the kettle 18 is upright as shown in FIG. 1, the funnel 29 aligns with an oil outlet 37 which is coupled via a delivery tube 39 to oil pump system 36. Oil is pumped up by system 36 to drain into funnel tube 29 and kettle 18 for use during a cooking cycle.

The kettle 18 may include an internal agitator, stir blade or rotor 38 (not shown) driven by a rotor drive shaft 26 having an upper pilot end which may be driven when the kettle is in a cooking position as shown in FIG. 1. Directly above socket 31 in drive housing 32 is a position sensor 35 which determines that shaft 26 is seated properly and kettle 18 is in a cooking position. The sensor 35 promotes more accurate positioning of the kettle after it is tilted. The stir blade and shaft 26 are rotated by appropriate stir motors which are activated by an appropriate operating switch on the panel 25 or by the control system of the invention. Further details regarding a suitable stir blade are set forth in U.S. Pat. No. 6,092,458, for example.

The kettle 18 shown in FIG. 1 is mounted in the cabinet of the popper 10 by way of a drive housing 40 and a spring-like hanger bracket 41 coupled to the top of the cabinet 21. On the other side of the kettle, the drive housing 40 houses a drive shaft which couples with the kettle to rotate and dump the kettle for automated dumping. Alternatively, the kettle might be configured to be manually dumped and could be connected in various appropriate ways to the cabinet to be manually tilted.

The kettle 18 is provided with a drive boss 60 and a hanger boss 61. The drive boss 60 is provided with a slot 62 for receiving the drive stub 52, supported by the drive housing 40. The hanger boss 61 extends from the other side of the kettle with respect to the drive boss 60 and is provided with an appropriate groove for receiving the depending leg 43 of the hanger bracket 41. The kettle may be rotated about the pivot axis 22. Alternatively, the kettle could be supported in a cantilevered fashion only by the drive boss or other supporting apparatus as will be appreciated.

As noted, further details regarding one suitable kettle system are shown in U.S. Pat. No. 6,092,458. The kettle preferably is removable from its support structure for cleaning the kettle.

Figure 3:
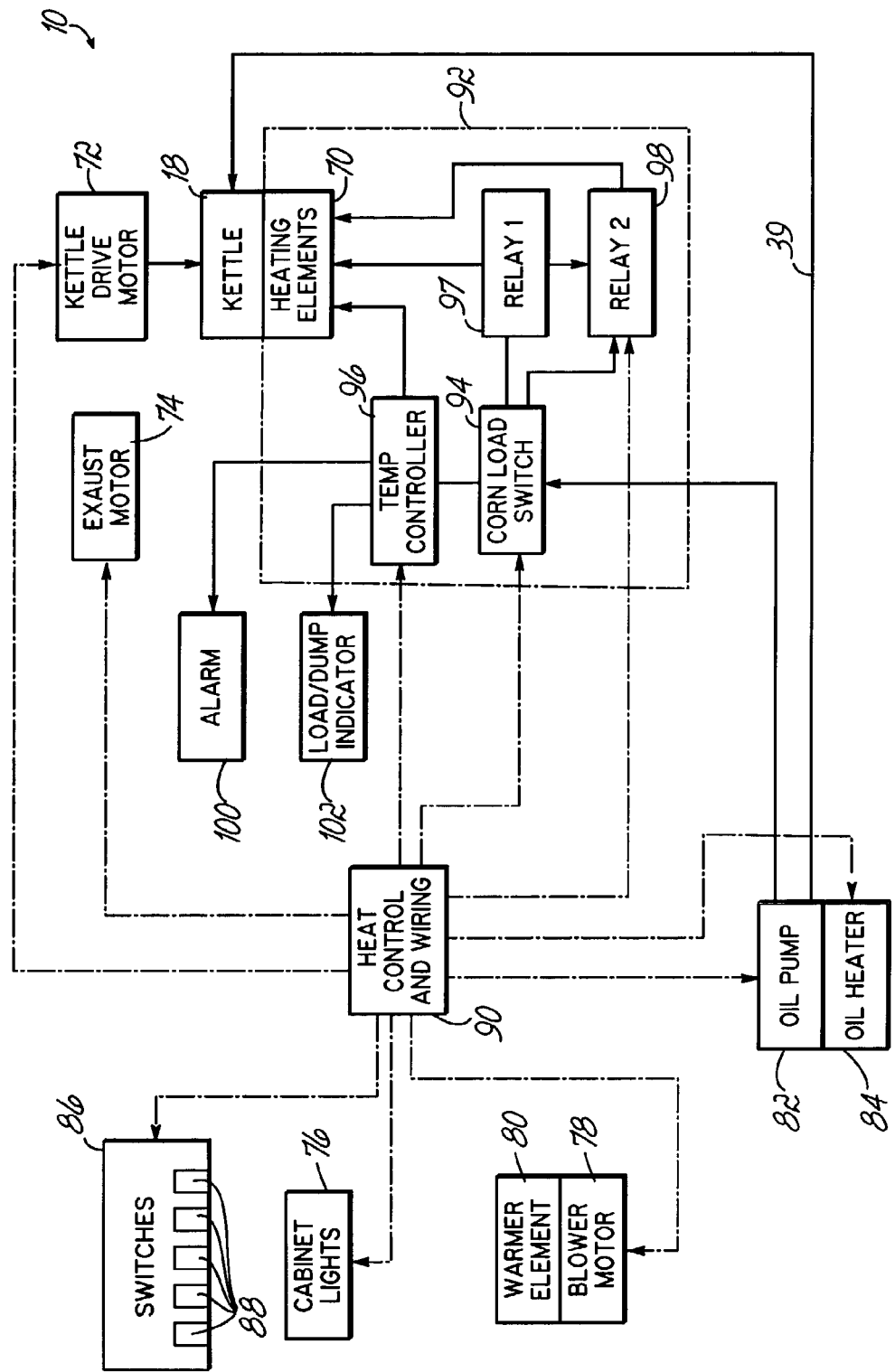
FIG. 3 is a block schematic diagram of systems and components of a popcorn popper in accordance with the principles of the present invention.

FIG. 3 illustrates a block schematic diagram for one possible embodiment of the present invention, showing various subsystems connected. As will be understood by a person of ordinary skill in the art, the present invention might be incorporated into any suitable existing popcorn popping machine wherein selective popcorn load and batch control and thermal control is desired. FIG. 3 illustrates schematically the possible interconnections for one embodiment of the invention. A person of ordinary skill in the art would make the appropriate conventional power and electrical and control connections for the components and subsystems discussed herein to achieve the features of the invention.

Popping machine or popper 10 includes kettle 18 having one or more heating elements 70 thermally coupled thereto for generating heat and thereby conductively or otherwise heating the kettle 18. For example, heating elements may be conductively mounted to contact the bottom of the kettle for heating the kettle to pop the popcorn therein. Popcorn popping machine 10 includes a plurality of subsystems which are all appropriately wired together as understood by a person of ordinary skill in the art. For example, popcorn popping machine 10 may include an internal stirrer or agitator (not shown) which is driven by a kettle drive motor 72 to agitate kernels within the heated kettle for efficient and consistent popping without burning of the kernels and popcorn. An exhaust motor 74 is used for drawing exhaust from the cabinet housing the kettle 18 as illustrated in FIG. 1. A blower motor 78 and warmer element 80 may be utilized in conjunction with each other for providing heat to the platform 17 for maintaining the popped popcorn in a warm and fresh state prior to serving. A suitable oil pump system, including a pump 82 and associated heater 84 for heating the oil may also be part of the popcorn popper 10, as shown. Oil heater 84 melts a load of oil or maintains oil in the system 36 in a liquid state, and the pump 82 delivers a charge of oil to the kettle 18. In that way, the oil pump 82 and kettle 18 will be operatively coupled together as illustrated by line 39 for delivering the desired charge of oil to the kettle for popping popcorn. The present invention provides for selective control of that amount of oil based on the selected batch size of corn. Popper 10 may also include switches 86 including one or more individual switches 88 for providing power to the various subsystems, as indicated on panel 25 in FIG. 1. For example, there may be an oil system master switch which powers the oil pump 82 and oil heater 84; a light switch for turning on the cabinet lights 76, a warmer switch, for powering the warmer element 80 and blower motor 78, a kettle motor and exhaust switch, for providing power to the kettle drive motor 72 and exhaust motor 74. Various other switches may also be included for powering various other subsystems of the popper 10, incorporating the invention. Cabinet lights 76 may include reflective floodlights for lighting the inside of the cabinet and the platform of popped popcorn. It may also include other lights, such as decorative lights, which are used for display purposes. Such lighting may include any suitable incandescent, neon, or fluorescent lights desirable for such purposes.

In FIG. 3, box 90 is reflective of heat control and system wiring and other wiring necessary for operating and powering the subsystems of popping machine 10. Generally, dashlines are utilized to indicate the various appropriate power connections for powering the various subsystems, whereas the solid lines are indicative of control functions of the invention. As noted, a person of ordinary skill in the art will recognize that the invention may be utilized with various appropriate popcorn poppers, thus the wiring 90 will be appropriately configured to operate the particular popper and power the various subsystems.

The illustrated embodiment of the popper 10 in FIG. 3 includes a heating system 92 for heating the kettle to pop the popcorn. The heating system comprises various components including the heating elements 70, a corn load switch, or selector switch 94, and a heat control system which may include components such as a temperature controller 96 and one or more relays 97, 98 in one aspect of the invention. The heat control system is operatively coupled to the heating elements 70 to control a rate or an amount of heat delivered to the kettle by the heating elements 70 as discussed further herein below. The corn load switch 94 is coupled to the heat control system and has one or more selectable states for selecting one of various rates or amounts of heat to be delivered to the kettle, based upon the batch size of the corn to be cooked, in accordance with the principles of the present invention.

Popcorn popper 10 also includes an audible alarm 100 and load/dump indicator 102 for indicating the temperature of the kettle and that the popcorn has been cooked and is ready for dumping onto the platform to be served so that a new batch of popcorn may be added. As discussed above, popper 10 might utilize a system for automatically dumping the popcorn when it is cooked, or may include a manual kettle which must be manually dumped. In that way, the alarm 100 and indicator 102 may be utilized to alert an attendant that the popcorn is popped and that the kettle is ready to be dumped and loaded with more corn. In accordance with one aspect of the present invention, thermal control of the kettle is based upon selective loads of corn that are to be popped. Specifically, depending upon the batch size or weight of a load of popcorn to be popped in particular, the present invention provides a selector switch, such as corn load switch 94, for selecting a desired operation for one or more corn loads to be popped. Generally, one suitable selector 94 switch has a number of selectable states or settings which correspond to selectable corn load sizes, such as an 18 oz. corn load state or setting, or a 32 oz. corn load state or setting, for example. The state or setting of the switch 94 varies the rate of heat delivered to the kettle. Larger loads or batches need more heat; smaller batches need less heat. Other variable size loads of corn might be designated as selectable loads as well, in accordance with the aspects of the present invention. Furthermore, the loads do not necessarily have to be discrete loads with discrete sizes.

For example, switch 94 might be a dial which allows an operator to select an almost infinite number of settings for various batch sizes along a continuum. Alternatively, the switch might be used to select batches which fall within a particular range, such as 18-24 oz., 24-32 oz., 32-40 oz., etc., for example. Therefore, the phrases "selectable states" as used herein for switch 94, and "selectable batch sizes," are not confined to discrete states or sizes, but also may be any various settings or sizes along a continuum which provide the selective operation of the popper for various batch sizes. Throughout the application, a switch having multiple discrete positions or discrete states is discussed, and example loads are indicated as 18 oz. and 32 oz. loads. However, the present invention is certainly not limited to such discrete amounts of popcorn to be popped, or discrete states or settings in the selector switch, or even the number of discrete loads (two load sizes are given in the illustrated example). The batch sizes and selectable states or settings of the corn load switch 94 correspond to selectable rates or amounts of heat to be generated by the heating elements 70 and delivered to kettle 18 for the selected batch size.

Figure 4:
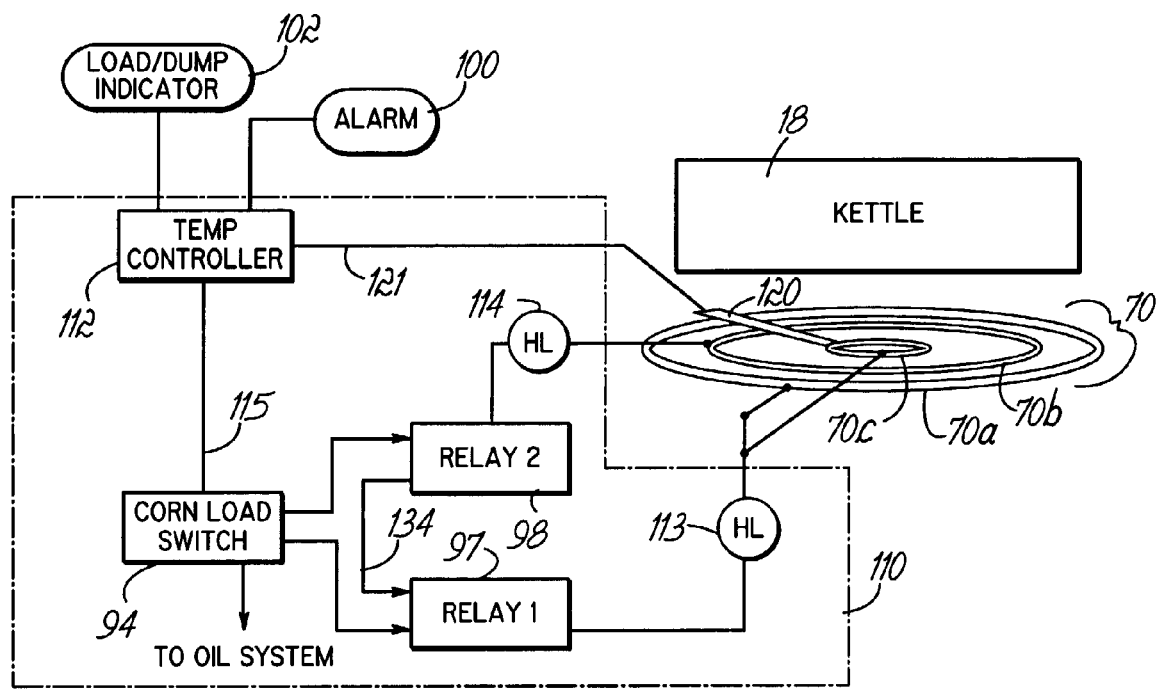
FIG. 4 is a block schematic diagram of the popcorn popper of FIG. 1.

FIG. 4 illustrates one embodiment of the invention wherein the corn load switch 94 includes positions corresponding to selectable states or settings, such as for an 18 oz. corn load or a 32 oz. corn load. The heat control system, indicated generally by reference numeral 110, includes corn load switch 94, a temperature controller 112, relays 97, 98 and high limit switches 113, 114. Other components might also be part of the heat control system in accordance with other aspects of the invention as discussed further herein below. One or more heating elements 70 are thermally coupled to kettle 18. In the embodiments described herein, three elements, 70a, 70b and 70c, are discussed. However, the heating elements may be a greater or lesser number than three, and may also take different forms than the forms disclosed herein. Specifically, the heating elements 70a, 70b and 70c are illustrated in one embodiment as concentric ring heating elements wherein 70a indicates an outer ring, 70b a middle ring, and 70c a center ring. In one embodiment of the invention as described herein, the outer ring 70a is a 1000 watt heating element, the middle ring 70b is an 1800-watt heating element, and the innermost or center ring 70c is a 1050-watt heating element. As will be understood by a person of ordinary skill in the art, other different types of heating elements might be used as well, such as tubular elements, thick film elements, thin film elements or any other suitable heating elements without departing from the spirit or scope of the present invention. It will be understood that the present invention is also not limited to the particular power of the illustrated heating elements.

In the embodiment illustrated in FIG. 4, heating elements 70a and 70c are coupled to relay 97, whereas relay 98, indicated as Relay 2, is coupled to the center heating element 70b. Relays 1 and 2 are coupled to the appropriate heating elements through high limit switches 113, 114. The high limit switches are thermally coupled to kettle 18. If the temperature of kettle 18 exceeds a high limit temperature, as determined by the switches 113 and 114, the switches will open to cut off power to the heating elements 70, and thus allow the elements and kettle to cool. The corn load switch 94 is coupled to temperature controller 112. In accordance with one aspect of the present invention, the temperature controller 112 defines one level of thermal control of kettle 18 in accordance with the aspects of the invention while the corn load switch 94 and the relays 97, 98 provide an additional level of thermal control. Temperature controller 112 may be a suitable temperature controller, such as an Athena temperature controller commercially available from Athena Controls, Inc. of Plymouth Meeting, Pa.

Figure 6:
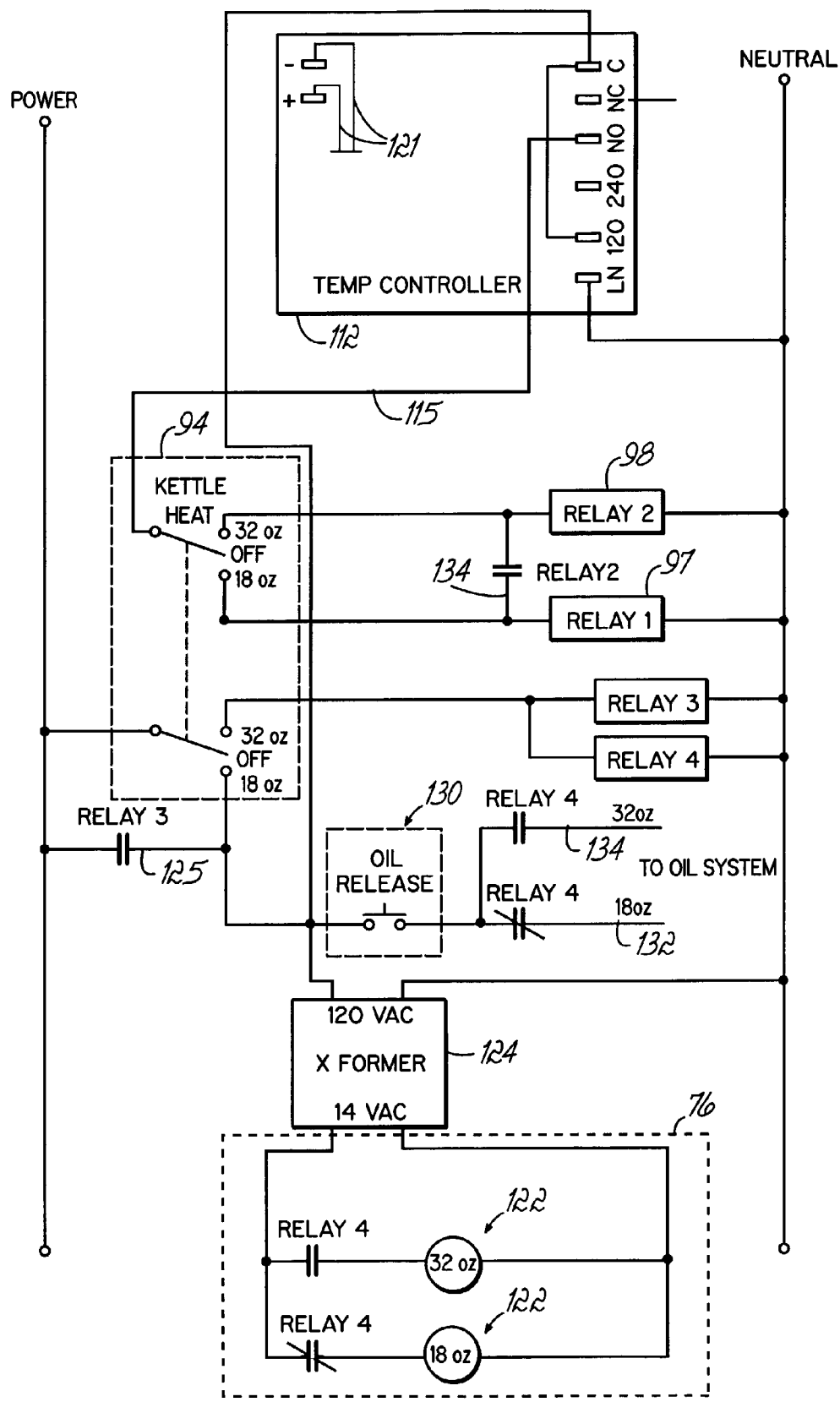
FIG. 6 is a line schematic diagram of a heat control system in accordance with one embodiment of the invention.

FIG. 6 illustrates one possible wiring connection for temperature controller 112, such as an Athena temperature controller. Temperature controller 112 includes a line input LN for coupling to neutral and 120 and 240 inputs for coupling to power. In FIG. 6, the 240 input is not utilized. The 120 input, on the other hand, is coupled to an input C which is in turn coupled to a power source, depending upon the setting or state of switch 94, as illustrated in FIG. 6. If the switch 94 is in an OFF position and is not moved to a position or setting for cooking popcorn, the temperature controller is not powered in the disclosed embodiment. The Athena temperature controller also includes an output NC, which is a normally closed output and an output NO, which is a normally open output. The NC output is coupled to a load/dump indicator 102 and dump alarm 100 (see FIG. 4). The NO output, on the other hand, is coupled to the corn load switch 94 as indicated by line 115 in FIG. 4 for providing power to selectively energize and drive the relays 97, 98, as necessary in accordance with one aspect of the present invention. Temperature controller 112 as illustrated in FIG. 6 also includes positive and negative inputs from a thermal sensor, such as a type K thermocouple 120, as illustrated in FIG. 4. The thermal sensor 120 measures the heat of the kettle and is thermally coupled to the kettle 18 proximate the heating elements for providing inputs on the lines 121 for the temperature controller 112.

FIG. 6 illustrates one embodiment of the invention wherein other relays are utilized in addition to Relays 1 and 2 (97, 98) for providing operation of various subsystems of the popper 10. Particularly, the embodiment illustrated in FIG. 6 utilizes bright indicator lights 122 for indicating the size of the selected load of corn to be popped. The indicator lights 122 might be part of the general cabinet lights 76 and may be driven by an appropriate transformer 124. When corn load switch 94 is adjusted or moved from OFF to ON, and specifically to a particular state, such as to select, for example, an 18 oz. load of corn to be popped, Relay 3 and Relay 4 are not energized. Power is then provided to temperature controller 112 and to transformer 124 through switch 94. This therefore provides power to the temperature controller 112 and also to the indicator lights 122. As indicated in FIG. 6, when Relay 4 is not energized, the path to the indicator light 122 which indicates an 18 oz. load is closed and the appropriate light is illuminated for showing an attendant that an 18 oz. load has been selected.

Selecting a load size and turning heat to the kettle ON through switch 94 provides power to the temperature controller for powering the kettle heating elements through energizing the relays, based on the setting of switch 94. If the kettle 18 is cool and has not yet been heated to its desired cooking temperature as indicated by thermal sensor 120 and determined by the set temperature of the temperature controller 112, the output NO from the temperature controller 112 provides power to the appropriate contacts of the selector switch 94, as indicated in FIG. 6. When the state or setting of the switch 94 indicates that an 18 oz. load of corn has been selected, Relay 1 (97) is energized through switch 94, which delivers power to and energizes the heating elements 70a and 70c for generating a desired rate or amount of heat which is then delivered to the kettle 18. That is, energizing Relay 1 turns the heating elements ON. The kettle then heats up and its temperature is sensed by the thermal sensor 120 which has inputs to the temperature controller 112. When the kettle reaches the set or desired temperature (which is controlled by the temperature controller 112 and may be adjusted through the temperature controller) the NO output is open, removing power to switch 94 and to Relay 1, and therefore to the heating elements through Relay 1 (97). The NC output of the temperature controller 112 is then closed to thereby power and to provide a visual indication through load/dump indicator 102, and an audible alarm through alarm 100 indicating that the kettle is ready for corn to be loaded and popped (FIG. 4). For subsequent loads of corn after the initial temperature drop of the kettle when a new batch of corn is added, the audible alarm 100 and indicator 102 will essentially indicate that the temperature of the kettle, with popped corn therein, has again risen to the set temperature and that the current batch of corn is popped and should be dumped (if manual dump), or is being or has been dumped (auto dump). A new charge of unpopped corn may then be loaded into the kettle 18.

Therefore, the temperature controller, by providing power to the relays, controls the heating of the kettle with respect to the kettle reaching the temperature set point. If the kettle is to be heated, and is not at the set point, Relays 1 and 2 may be selectively energized for varying the amount of heat or rate of heat to the kettle.

With respect to loading the kettle with ingredients, referring again to FIG. 6, when the corn is added, oil is added reflective of the amount of corn in the kettle and the state or setting of the corn load switch 94, in accordance with another aspect of the present invention. As illustrated in FIG. 4, the corn load switch 94 also has an output to the oil system, which is also illustrated in the embodiment of FIG. 6. For example, when an 18 oz. load of corn is selected based upon the state of switch 94, Relay 4 is not energized, and therefore the 18 oz. path to the oil system is utilized, such as through an oil push button switch 130 which may be engaged to deliver a charge of oil to the kettle. The oil pump 82 of the popcorn popper 10 is appropriately configured for receiving the signal or power on the 18 oz. path 132 and pumping the appropriately sized charge of oil to the kettle 18. For example, the oil pump might be timer controlled, with selectable timing associated with the various selectable states or settings of the corn load switch 94 to deliver the proper amount of oil. Therefore, in accordance with another aspect of the invention, the selectivity feature of the invention also provides for the selection of an oil charge which corresponds to the selected load or quantity of corn to be popped and the selected amount or rate of heat to be delivered to the kettle. As noted above, the control of the amount of oil is also not limited to the described embodiment or corn loads of 18 oz. and 32 oz. Nor is the oil selection limited to discrete states. The output to the oil system may be based on a continuum, such as when the selector switch or corn load switch 94 is a dial with infinite adjustment settings.

Referring again to FIGS. 4 and 6, when the corn load switch 94 is moved to another non-OFF state, such as to a state reflective of popping a 32 oz. load of corn, Relay 1 (97) and Relay 2 (98) are both energized. For example, Relay 2 may be operatively coupled with Relay 1 through line 134, such that energizing Relay 2 also energizes Relay 1 simultaneously. As illustrated in FIG. 6, reference numeral 134 indicates a path for energizing Relay 1 when Relay 2 is energized. Relays 1 and 2, when energized, then provide power to all of the heating elements 70, including the middle element 70b, to provide a different or higher amount of heat to be delivered to the kettle corresponding to the different or larger selected corn load. As may be appreciated, energizing the additional element 70b will provide a greater rate of heat delivered to the kettle for the greater amount of corn to be popped, such as a 32 oz. load of corn. Again, the particular amounts of corn chosen for the various examples in the embodiments disclosed herein are not limiting, and the selectable states or settings of the selector switch 94 may correspond to different loads or more loads than just an 18 oz. or 32 oz. load.

Referring again to FIG. 6, when the selective state of switch 94 is for a 32 oz. load, Relay 3 and Relay 4 are energized. Power is then delivered to the temperature controller 112 and to the oil system through the path 125 indicated by the condition of an energized Relay 3. With Relay 4 energized, the appropriate indicator 122 for a 32 oz. load of corn is illuminated and the appropriate power signal on line 134 is directed to the oil system when the oil push button 130 is actuated. The kettle heating system then operates as discussed above with respect to heating the kettle and popping corn, with various dumping and loading junctures indicated by audible and visual indicators.

Herein, the various relays are referred to as being "energized" to indicate a change in their state or their outputs. Depending on the type of relay and its setup, the desired change in state might be just as readily achieved through "de-energizing" the relay. Therefore, the term "energize" is not meant to be limiting to specific relays or their specific setups. Rather, the term is used to generally indicate a change in the state of the relay and the system it is incorporated into.

Also, herein, the terms "amount" and "rate" of heat are used somewhat synonymously to indicate that varying rates of heat delivery are achieved by using more/less heating elements or by delivering more/less power to the heating element or elements in accordance with aspects of the invention.

Figure 5:
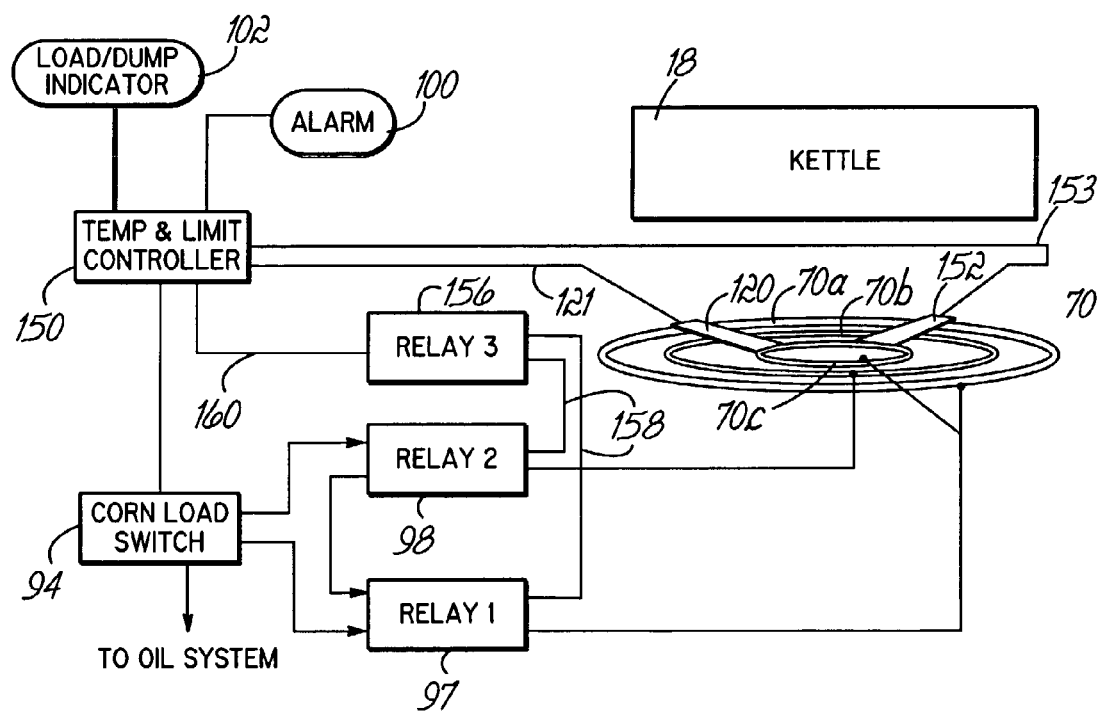
FIG. 5 is a block schematic diagram of a heat control system in accordance with an alternative embodiment of the invention.
Figure 7:
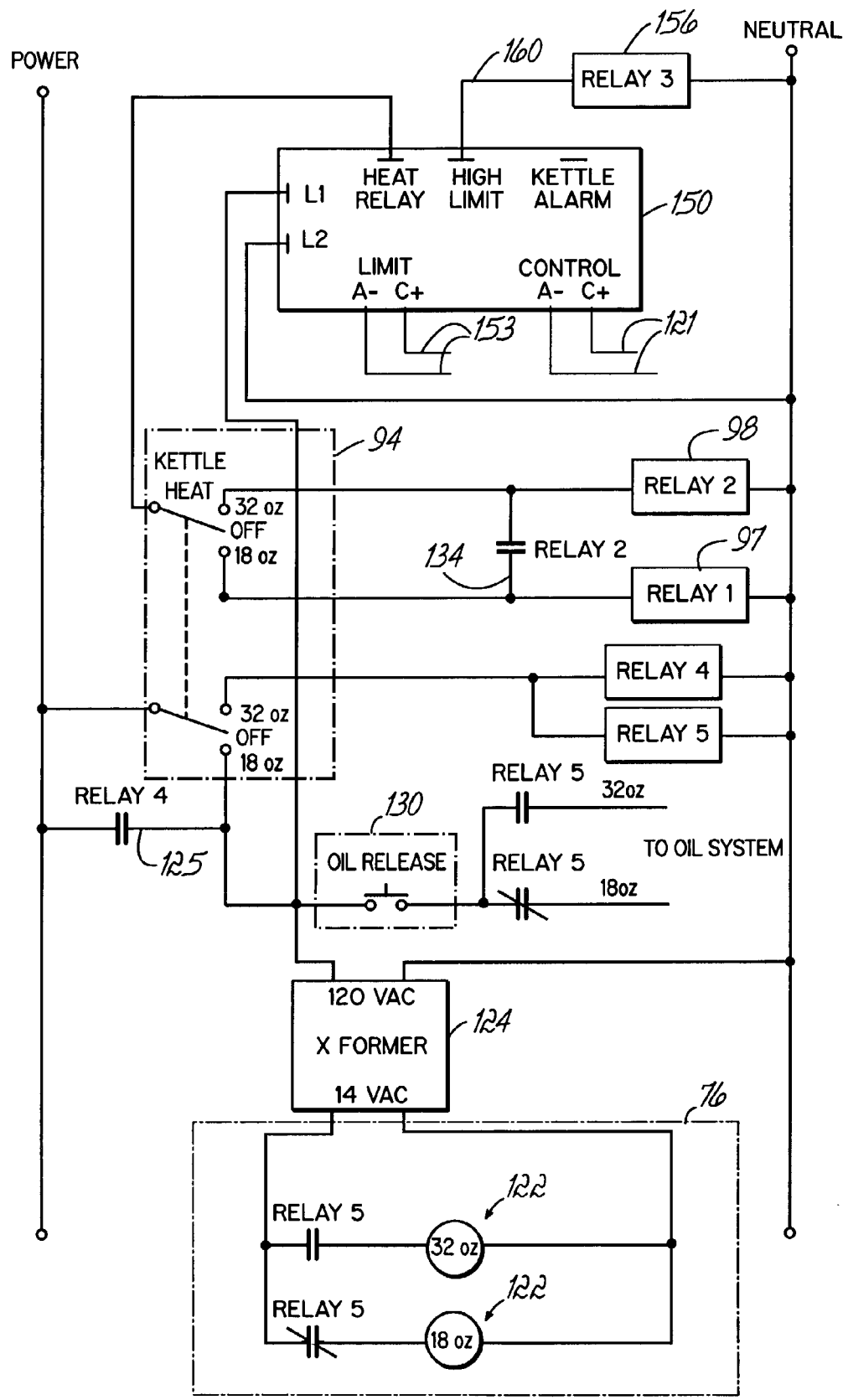
FIG. 7 is a line schematic diagram of a heat control system in accordance with another embodiment of the invention.

FIGS. 5 and 7 illustrate an alternative embodiment of the present invention which incorporates a temperature controller 150 which includes a high limit feature for thermally controlling heating of the kettle, rather than relying upon high limit switches, such as switches 113, 114 in the embodiment discussed above. In a unique incorporation of the high limit feature within a solid state temperature controller, the embodiment of the invention illustrated herein utilizes an additional relay controlling the other relays coupled to the heating elements of the kettle 18. Furthermore, an additional sensor is utilized to act as a high limit sensor for the temperature controller 150.

More specifically, the system of FIGS. 5 and 7 utilizes a selector switch, such as corn load switch 94. Similar reference numerals will be utilized for similar devices or subsystems from the embodiments previously discussed. The visual load/dump indicator 102 and audible alarm 100 may also be utilized. Kettle 18 incorporates one or more heating elements 70. The embodiment of FIG. 5 illustrates three such elements similar to that embodiment illustrated in FIG. 4. However, a greater or lesser number of elements might be utilized. The elements 70a, 70b and 70c are shown as arranged and thermally coupled to the kettle in concentric rings. Temperature controller utilizes the input of a thermal sensor, such as a type K thermocouple 120 providing a signal to the temperature controller on line 121. Temperature controller 150 also utilizes a high limit sensor, which may be another type K thermocouple 152 which provides an input to the temperature controller 150 on line 153. The thermal sensors 120, 152 are thermally coupled to the kettle for effectively measuring the temperature of the kettle to provide thermal control and also to prevent it from significantly exceeding a predetermined high limit.

The embodiment of FIGS. 5 and 7 utilizes Relay 1 (97) and Relay 2 (98) coupled to the heating elements 70 in a way to provide selective heat control based upon the state or setting of the corn load switch and the load of corn to be placed in the kettle. To that end, if the state of the switch 94 is for cooking a smaller load of corn, Relay 1 might be energized to energize the outer element 70a and the innermost element 70c. Alternatively, for a larger load of corn, Relay 2 might be energized simultaneously with Relay 1 to power all of the heating elements, as discussed above.

Referring to FIG. 7, the arrangement of Relays 1 and 2 is similar to that shown in FIG. 6 and described above wherein upon energizing Relay 2, Relay 1 is also energized. Similarly, for selecting the amount of oil to be charged to the kettle and indicating the selected load, switch 94 operates with relays, indicated as Relay 4 and Relay 5 in FIG. 7 to provide visual indication of the size of the load selected and also provide the appropriate input to the oil system depending on the selected load. In FIG. 7, the relays utilized for providing the appropriate load size and the appropriate amount of the oil chart are indicated as Relay 4 and Relay 5, but may be similar to Relay 3 and Relay 4 shown within FIG. 6. Relay 3 in FIG. 7 is directed to the inventive high limit feature of the embodiment illustrated in FIGS. 5 and 7 as discussed further below.

Specifically, temperature controller 150 is a solid state temperature controller, such as an NCC heat control available from Ametek National Controls Corp. of Chicago, Ill. Temperature controller 150 includes line inputs L1 and L2 for powering the temperature controller. Temperature controller 150 also includes limit inputs from thermal sensor 152 on lines 153, and the control input from thermal sensor 120 on lines 121. The heat Relay output of the temperature controller 150 is provided to the selector switch or corn load switch 94 for selectively energizing Relay 1 (97) and Relay 2 (98) for selective generation of heat for kettle 18 in accordance with the principles of the present invention. Corn load switch 94 also provides power for selectively energizing Relay 4 and Relay 5 shown in FIG. 7 for control of the oil system and indication of the selected popcorn load size, such as with indicator light 76, as discussed above. The temperature controller 150 also includes a kettle alarm output which couples selectively to the load/dump indicator 102 and audible alarm 100 which may be built into the temperature controller 150 or separate therefrom for indicating that the kettle has reached the temperature sufficient for adding a load of corn, or dumping a previously cooked load of corn and adding another subsequent load.

In operation, the embodiment illustrated in FIGS. 5 and 7 operates somewhat similarly to that discussed above with respect to FIGS. 4 and 6. That is, when the kettle heat is ON, based on a selected state or setting of switch 94, the temperature controller is powered to provide an output (Heat Relay) when the kettle is not yet heated up to the temperature set point, as indicated by the control inputs on line 121, the temperature controller 150 provides power to terminals of switch 94 (Heat Relay output), which may then selectively energize Relay 1 and Relay 2 to thereby provide power to the heating elements 70 to generate heat and heat the kettle. Depending upon the state of the corn load switch 94 and selective energizing of the relays and heating elements, different rates or amounts of heat will thereby be generated by the heating elements and delivered to the kettle, such as to cook different loads of corn (e.g., 18 oz., 32 oz., etc.). When the corn is loaded, the temperature of the kettle drops, due to the thermal loading of the corn. As the corn pops, the temperature of the kettle again rises and when the set temperature is sensed on the control lines 121, the temperature controller opens the heat relay output so that power is not delivered to switch 94. This thereby de-energizes Relay 1 and/or Relay 2 through the switch 94 to reduce heat delivered to the kettle to prevent the popcorn from burning.

In the embodiment of the invention illustrated in FIGS. 5 and 7, Relay 3 (156) is coupled to Relay 1 and Relay 2, as indicated by lines 158 in FIG. 5, to power the relays. The power is then passed through to the heating elements when the Relays 1 and 2 are energized. Therefore, Relay 3 controls the delivery of power through Relay 1 and Relay 2. Alternatively, in the embodiment of FIG. 6, the Relays 1 and 2 have power wired directly to them, such that when the relays are energized, power is delivered to the heating elements. In the embodiment illustrated in FIGS. 4 and 6, power is available at the Relays 1 and 2 from a direct source, such as a power cord. Once the Relays 1 and 2 are energized, power is delivered to the heating elements. However, in the embodiment of FIGS. 5 and 7, power is available to Relays 1 and 2 through the Relay 3 (lines 158). Therefore, unless Relay 3 is appropriately energized (or de-energized, depending on the type of relay), power is not delivered to the heating elements even if Relays 1 and 2 are energized. A high limit signal on line 160, indicative of kettle 18 reaching and/or exceeding the high limit temperature set point, as set in the temperature controller 150, causes a change of state in Relay 3 (156) such that power is removed from Relay 1 and Relay 2 (line 158 in FIG. 5). Therefore, power is removed from the elements 70, regardless of whether Relays 1 and 2 are energized by the selected state of the corn load switch 94. In that way, Relay 3 (156) uncouples power to the heating elements when the high limit of the temperature controller 150 has been reached to prevent the heating elements 70 from being further heated. The high limit point is monitored and determined by the output in lines 153 from sensor 152. The high limit point may be set in controller 150. Therefore, in the embodiment illustrated in FIGS. 5 and 7, a high limit function of the heat control system of the invention is incorporated within the solid state temperature controller 150, eliminating the need for separate high limit switches 113, 114 as illustrated in FIG. 4.

Figure 8:
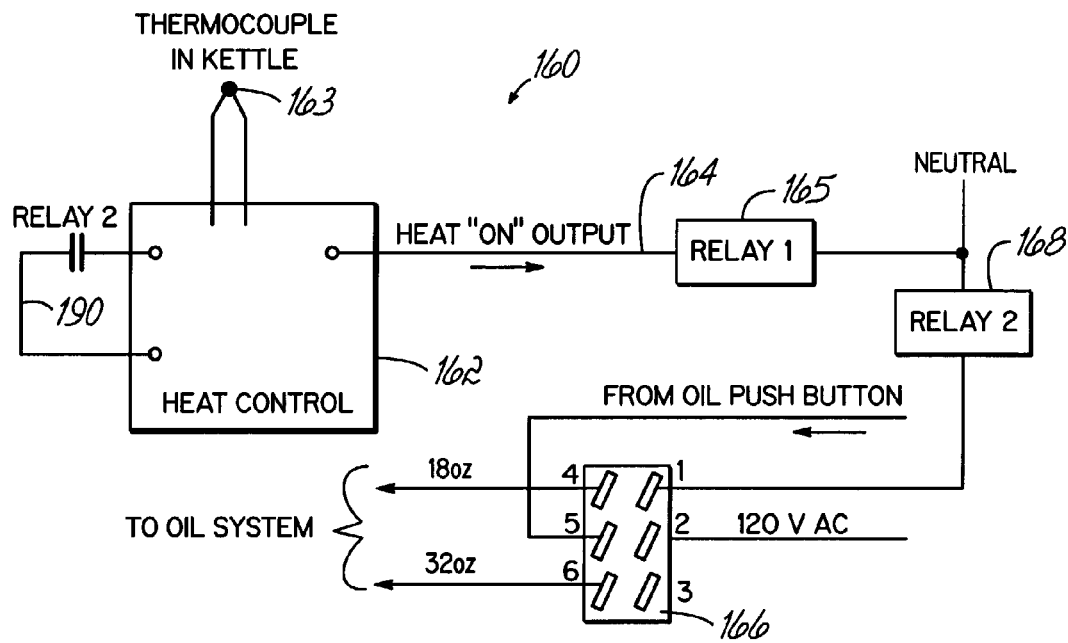
FIG. 8 is a line schematic diagram of a heat control system in accordance with still another alternative embodiment of the invention.
Figure 9:
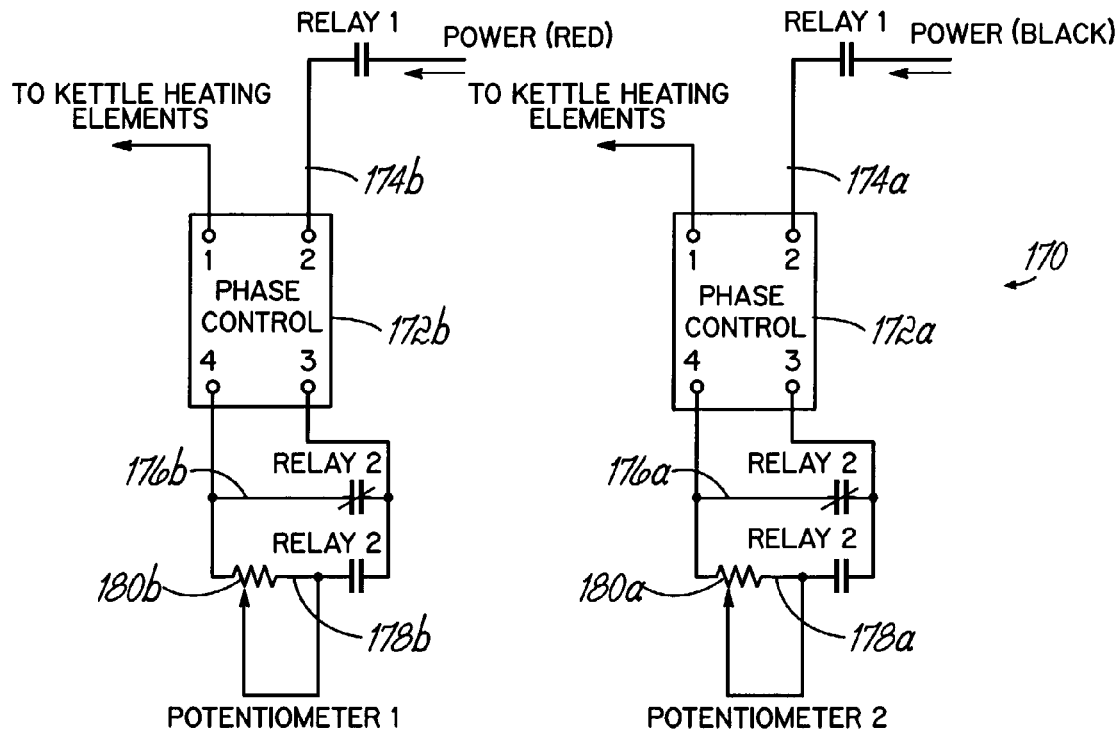
FIG. 9 is a line schematic diagram of a phase control system in accordance with one aspect of the present invention.
Figure 10:
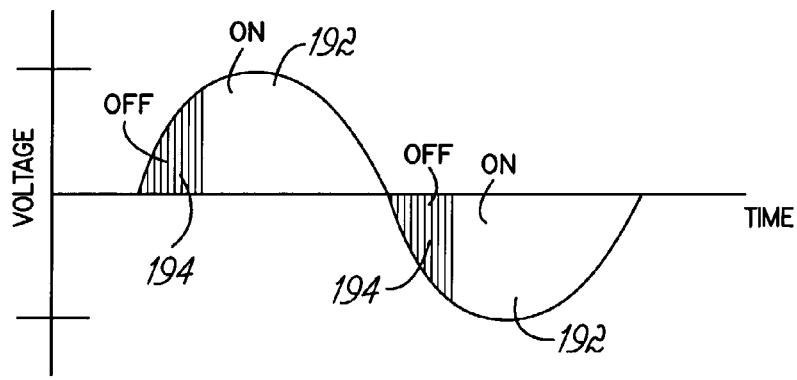
FIG. 10 is a power graph for a heat control system in accordance with one aspect of the present invention.

FIGS. 8-10 disclose another embodiment for a heat control system in accordance with the principles of the present invention. The system 160 includes a solid state heat control 162, such as one of the temperature controllers 112, 150, as discussed above. Usually, the solid state heat control device 162 will be coupled to a suitable sensor, such as a thermocouple 163 which is thermally coupled to the kettle. Depending on the temperature of the kettle, an output is provided on line 164 to a first relay 165 indicated as Relay 1 in FIG. 8. A selector switch 166 operates similarly to the selector switches 94 discussed above which have selectable states or settings for different loads of corn to be popped. One side of the selector switch, indicated by leads 4, 5, 6, is directed to controlling the charge of oil to be added to the kettle for a particular selected load, depending on the state or setting of switch 166. An input on lead 5, such as from an oil push button switch, is coupled by the selector switch 166 to lines corresponding to different amounts of oil to be added to the kettle for different selected corn loads, such as an 18 ounce load or a 32 ounce load as illustrated in FIG. 8. The other side of switch 166, as indicated by leads 1, 2, and 3, is utilized for heat control to vary the rate of heat to be delivered to the kettle based upon the selected load of corn. As illustrated in FIG. 5, in one selected state of switch 166, a relay 168, indicated as Relay 2, is coupled to power (120 VAC) and is thereby energized.

Referring now to FIG. 9, the control system 160 illustrated in FIG. 8 also may comprise a phase control system 170 illustrated in FIG. 9. Phase control system 170 controls heat delivered to the kettle and is operable for selectively adjusting portions of power cycles delivered to the heating elements for varying the amount of heat generated by the heating elements 70, and ultimately varying the amount of heat delivered to the kettle. In previously discussed embodiments of the invention, controlling the amount of heat delivered to the kettle comprises steps of turning various of the heating elements selectively ON and OFF based upon the selected state or setting of a selector switch. In the embodiment illustrated in FIGS. 8-10, the amount or rate of heat delivered to the kettle is varied by selectively adjusting the power cycles seen by a heating element or multiple heating elements, rather than selectively turning one or more of the heating elements ON or OFF.

Referring to FIG. 9, system 170 includes at least one phase control circuit. Two phase control circuits 172a, 172b are illustrated in the embodiment of FIG. 9 for powering multiple heating elements, although a single heating element might be used. The phase control circuits are operable for delivering power to the kettle heating elements through the leads 1 and 2 of those circuits. Such power delivery is initially based upon heat control device 162 which determines (based on sensor 163) that the kettle is below a set temperature and is to be heated. To provide power to the heating elements, and particularly to the phase control circuits, Relay 1 (165) is energized. As shown in the Figures, the power paths 174a, 174b to the number 2 lead of each phase control circuit 172a, 172b are coupled to power when Relay 1 (165) is energized by the heat control device 162. Power is therefore available for the kettle heating elements (or single element) coupled to lead 1 of the phase control circuit 172a, 172b. The phase control circuits have inputs (leads 3, 4) for setting the portion of the power cycle on lead 1 which is delivered to the heating elements 70 for varying the amount of heat generated by those elements. A portion of the power cycles is thereby selectively adjustable to vary the heat generated at the kettle for different corn loads.

More specifically, two resistance paths are provided as inputs for each phase control device 172a, 172b. Referring to FIG. 9, paths 176a, 176b are reflective of the inputs provided to phase control devices when Relay 2 (168) is not energized (or is in one state). In the Figures, the paths 176a, 176b are illustrated as short circuits between the leads 3 and 4 of the phase control devices when Relay 2 is not energized. However, other suitable resistances or inputs might be selected for such a path. For example, Relay 2 will not be energized for certain selectable states or settings of the selector switch 166 in the embodiment illustrated in FIG. 8, such as when the switch 166 couples leads 2 and 3 together (32 oz.), rather than leads 2 and 1 (18 oz.). The phase control input between leads 3 and 4 provides an input which causes, through the phase control circuits, a certain portion of the power cycles at lead 2 to be delivered to the heating elements to vary the rate of heat generated by those elements.

Alternatively, if the selected state of selector switch 166 is such that leads 2 and 1 are coupled together, Relay 2 (168) is energized (or in another state) and the input or resistance path between the leads 3 and 4 of the phase control circuits 172a, 172b is indicated by path 178a, 178a within FIG. 9. In such a path, a selective resistance is provided, such as by variable potentiometer 180a, 180b, for providing a different portion of the power cycles to be delivered on lead 1 to the heating elements than that portion of the power cycles delivered when the paths 176a, 176b are chosen. Therefore, different portions of the power cycles are used to selectively control the heat generated by the kettle.

In FIG. 9, two generally duplicated phase control circuits are illustrated for controlling power cycles delivered to the multiple heating elements in the embodiments described above. For example, phase control circuit 172a might be coupled to the center heating element 70b, whereas phase control circuit 172b might be coupled to the outer element 70a and innermost element 70c. The embodiment of FIG. 9 might be used in the previously described embodiments as an alternative wherein multiple elements are separately powered by multiple power inputs (red and black). With such phase control, all of the available elements are powered simultaneously, and the power cycle phase control allows the selective delivery of different amounts of heat to the kettle. As would be understood by a person of ordinary skill in the art, a single phase control circuit 172a might be utilized and thereby coupled to all of the available heating elements. Furthermore, only one heating element might be utilized with a single phase control circuit 172a for providing the desired selectable adjustment of the portions of the power cycle delivered to the heating element for varying the amount of heat generated by the heating element.

FIG. 10 illustrates the selective adjustment of the portions of the power cycle delivered to the heating elements provided by the embodiment illustrated in FIGS. 8 and 9. Specifically, the power cycle referred to, would generally be a voltage signal provided to the heating elements, such as a 60 Hz sine wave 190 illustrated in FIG. 10. If the selected state or setting of the selector switch 166 is indicative that a large load of popcorn is to be popped, little or no phase control might be provided so that the heating elements receive the full voltage signal and reflected power cycle. In general, the power delivered to the heating elements is reflective of the product of the voltage (V) delivered to those elements and the current (I) delivered to those elements. Accordingly, by affecting the portion of the voltage cycle 190 delivered to the heating elements, the power cycle is adjusted. As illustrated in FIG.

10, delivering the full power cycle to the heating elements will be reflective of full power for those heating elements for the largest load of corn to be cooked. As such, the entire power cycle might be delivered as indicated by the full "ON" section 192 in FIG. 10 for the full cycle. Alternatively, if the selectable state of the selector switch 166 is indicative that some smaller load of corn is to be cooked, a smaller portion of the power cycle coming from the phase control circuits 172a, 172b will be delivered as indicated by the "OFF" sections 194 of FIG. 10. That is, certain sections 194 of the power cycle will be "OFF" and will not be delivered, and thus less power is delivered to the heating elements. Depending upon the setting of the potentiometers 180a, 180b, the size of the "OFF" portion 194, versus the "ON" portion 192 may be adjusted. Alternatively, some portion of the power cycle might always be "OFF" depending upon the selectable states of the selector switch 166, although the size of that portion will still be determined by the inputs from the paths 176a-b, 178a-b, selected for the phase control circuits. As illustrated in FIGS. 8-10, the selector switch 166 with potentially two selected states is illustrated. However, a greater or lesser number of selected states or settings might also be utilized, providing different phase control resistance paths for selectively adjusting portions of the power cycle delivered to the heating elements.

As portions of the power cycles are delivered to the heating elements for varying the amount of heat generated by the heating elements, the temperature sensor 163 continues to sense the kettle temperature. When the kettle reaches a predetermined set temperature, as determined by the heat control device 162, Relay 1 is de-energized, and no power is delivered to the kettle heating elements. In accordance with another aspect of the present invention, the set point of the heat control device 162 might also vary based upon the selected state of selector switch 166. For example, input leads 190 in FIG. 8 schematically illustrate a path which is open or closed based upon the energization of Relay 2 and the selected state of switch 166. When Relay 2 is energized, path 190 operates to provide desired inputs to the heat control device 162 such that it has one set point when providing an output on line 164 to energize Relay 1. When Relay 2 is not energized, the heat control device 162 has another set point. In that way, the embodiment illustrated in FIGS. 8-10 not only adjusts a power cycle, by which heat is generated by the heating elements, but also determines the ultimate set point of the kettle being heated for more precise thermal control of the popping process.

Figure 11:
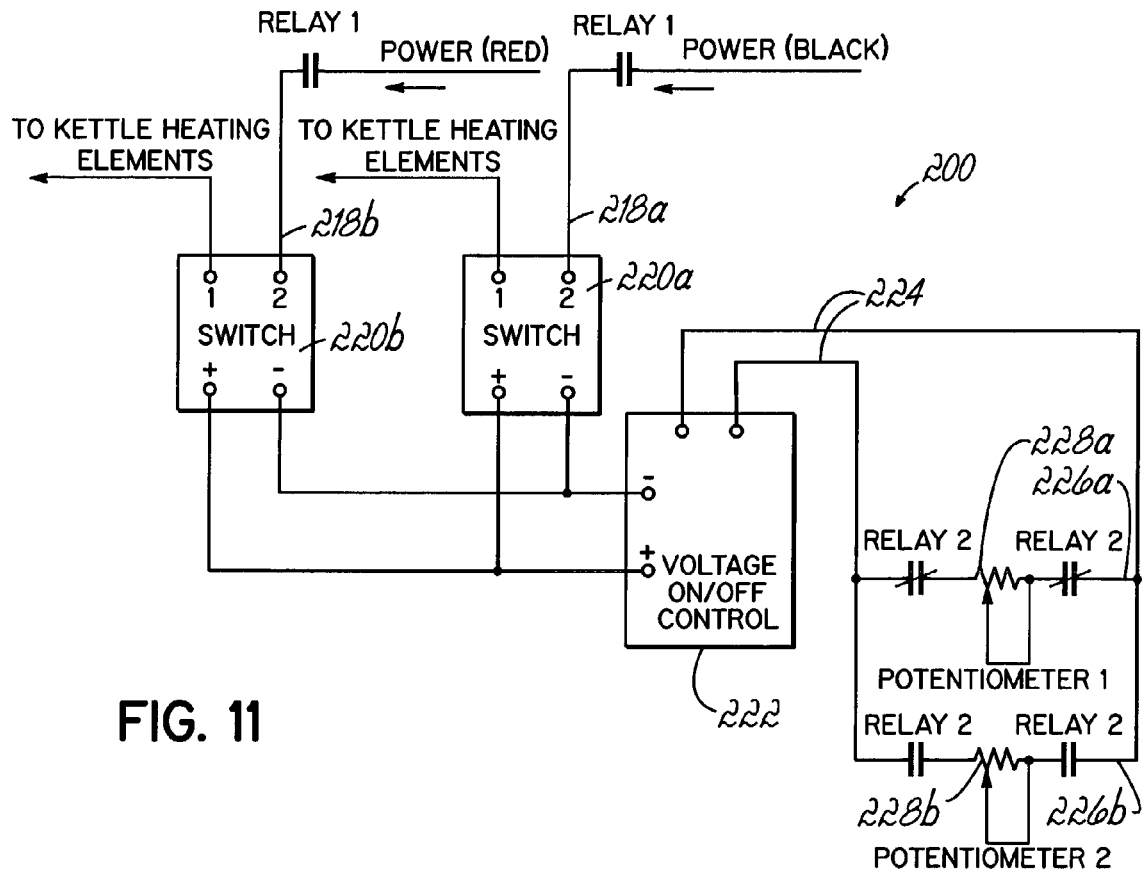
FIG. 11 is a line schematic diagram of a power cycle control system in accordance with one aspect of the present invention.
Figure 12:
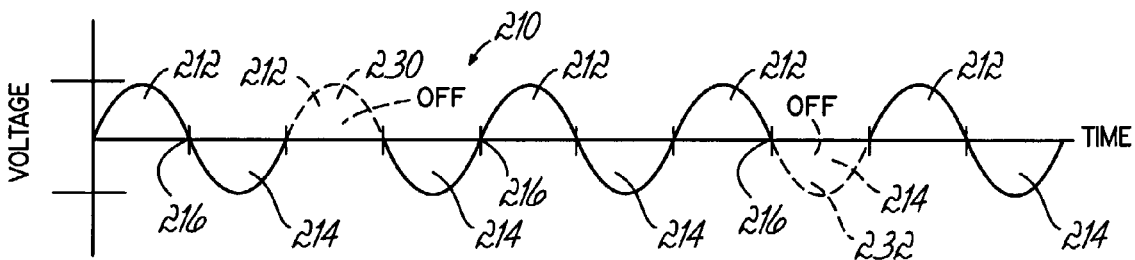
FIG. 12 is a power graph for a heat control system in accordance with one aspect of the present invention.

FIGS. 11 and 12 illustrate another embodiment of the invention utilizing a power control system 200 for providing thermal control of the kettle of the popcorn popping machine based upon selected loads of corn to be cooked. The power control system 200 of FIGS. 11 and 12 is utilized in conjunction with the system 160 of FIG. 8. The power control system 200 is operable for varying the actual number of power cycles delivered to the heating element within a time period for thereby varying the amount of heat generated by the heating element. That is, rather than turning ON and OFF portions of the power cycles delivered to the heating elements, the number of cycles delivered to the heating elements within a selected time period is varied. That is, power will be ON and delivered to the heating elements for a certain number of cycles and then OFF for a certain number of other cycles, and then ON again for another certain number of cycles, etc. In one embodiment of the invention, the power cycles might be turned off at zero crossover points for the power voltage signal. Specifically referring to FIG. 12, for example, a sinusoidal voltage signal 210 is illustrated having a number of cycles. For a typical sine wave, each cycle will include a positive portion 212, a negative portion 214, and a zero crossover point 216. Depending upon a selected state or setting of switch 166, different numbers of power cycles might be delivered to the heating element within a time period. For example, if ten cycles are delivered in a certain time period to the kettle heating elements for one selected state of switch 166, a lesser number, such as six cycles, might be delivered in the same time period to the kettle heating elements for another selected state of switch 166. Still another number of cycles might be delivered for another selected state of the switch, and so on. In that way, the amount of heat generated by the heating elements and delivered to the kettle within a time period is varied based upon the selected mode as indicated by the state of switch 166. In one embodiment, full or half portions of the cycles delivered to the kettle heating elements might be turned ON or OFF at the zero crossover point 216, such as positive cycle half 230 and negative cycle half 232 as shown in FIG. 12 by way of example.

FIG. 11 illustrates one embodiment of power cycle control system 200 for achieving such results. Specifically, when Relay 1 is energized as discussed above with respect to FIG. 8, power is delivered on lines 218a, 218b to solid state switches 220a, 220b to be delivered to the kettle heating elements through the 1 and 2 leads (+, −) of the switches. A voltage ON/OFF control device 222 is coupled to appropriate leads of the switches for providing the inputs to change the state of those switches between an open state and a closed state. For example, when closed, power cycles are delivered to heating elements; when open, power cycles are not. In that way, the switches may be selectively controlled to open and close based upon the voltage ON/OFF control device 222 to thereby vary the number of power cycles delivered to the heating elements within a time frame, and vary the heat generated at the kettle within that time frame. Inputs to the voltage ON/OFF control device 222 are provided on lines 224 which provide varying resistance paths 226a, 226b. The variable resistances in those paths are shown to be variable by potentiometers 228a, 228b. Alternatively, fixed resistors might also be utilized. Referring again to FIG. 8, Relay 1 must be energized, indicating that heat is to be supplied to the kettle and the kettle has not exceeded the temperature set point. Depending upon the selected state or setting of switch 166, Relay 2 may be energized. If Relay 2 is energized, path 226b provides resistance on the input lines 224. If Relay 2 is not energized, path 226a provides a resistance input on the input lines 224. The input paths and their respective resistances may thereby be selected for selecting the number of power cycles delivered and the ON/OFF points at which device 222 opens and closes the switches 220a, 220b. In that way, variable amounts of heat are generated by the heating elements at the kettle for adjusting to variable loads of corn to be cooked by the kettle. In the systems of FIGS. 9 and 11, inputs other than resistance inputs might be used to select the amounts of heat to be generated for variable corn loads.

While the present invention has been illustrated by the description of the embodiments thereof, and while the embodiments have been described in considerable detail, it is not the intention of the Applicants to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of Applicants' general inventive concept.

What is claimed is:

1. A method for popping popcorn with a popcorn popper comprising:

containing corn to be popped within a kettle, the kettle having at least one heating element thermally coupled thereto to heat the kettle with only the at least one heating element delivering heat to the kettle during pre-heating of the kettle when it is initially in a cold state and during a popping cycle, the at least one heating element having an OFF state and ON state;

based on selectable states of a selector switch, selecting at least one of multiple rates of heat generated by the at least one heating element, with only the at least one heating element being turned ON based on the selected state of the selector switch during pre-heating of the kettle when it is initially in the cold state and during a popping cycle;

selectively controlling the rate of heat delivered to the kettle during pre-heating of the kettle when it is initially in the cold state and during the popping cycle by varying the rate of heat generated by the at least one heating element based on the selected state of the selector switch, the rate of heat delivered to the kettle being selectively controlled from when the at least one of multiple rates of heat is selected until the kettle has reached a predetermined temperature set point;

sensing the temperature of the kettle; and maintaining the temperature of the kettle proximate the predetermined temperature set point through operation of the at least one heating element.

2. The method of claim 1 wherein the kettle has a plurality of heating elements thermally coupled thereto, the method further comprising selectively turning ON and OFF at least one of the plurality of heating elements for varying the heat generated by the heating elements and delivered to the kettle.

3. The method of claim 2 wherein the at least one of the plurality of heating elements is selectively turned ON and OFF based upon a selected state of the selector switch.

4. The method of claim 1 wherein the selectable states of the selector switch are reflective of variable amounts of corn that may be in the kettle to be popped.

5. The method of claim 1 further comprising selectively adjusting portions of power cycles delivered to the at least one heating element for varying the rate of heat generated by the at least one heating element.

6. The method of claim 5 further comprising selectively adjusting the portions of the power cycles delivered to the at least one heating element based on a selected state of the selector switch.

7. The method of claim 1 further comprising selectively varying the number of power cycles delivered to the at least one heating element in a time period for varying the amount of heat generated by the at least one heating element.

8. The method of claim 7 further comprising selectively varying the number of power cycles delivered to the at least one heating element based on a selected state of the selector switch.

9. The method of claim 1 wherein the at least one heating element is coupled to a relay and the method comprises selectively energizing the relay to control the heat delivered to the kettle.

10. The method of claim 1 further comprising delivering an amount of oil to the kettle corresponding to the selected state of the selector switch.

11. The method of claim 1 further comprising providing a humanly perceptible indication corresponding to the selected state of the selector switch.

* * * * *